United States Patent
Tanaka et al.

(10) Patent No.: US 7,712,567 B2
(45) Date of Patent: May 11, 2010

(54) SEAT BELT APPARATUS

(75) Inventors: Koji Tanaka, Tokyo (JP); Masato Takao, Tokyo (JP); Koji Inuzuka, Tokyo (JP)

(73) Assignee: Takata Corporation, Tokyo (JP)

( * ) Notice: Subject to any disclaimer, the term of this patent is extended or adjusted under 35 U.S.C. 154(b) by 815 days.

(21) Appl. No.: 11/582,346

(22) Filed: Oct. 18, 2006

(65) Prior Publication Data

US 2007/0084955 A1    Apr. 19, 2007

(30) Foreign Application Priority Data

Oct. 19, 2005    (JP)    ............... 2005-305100

(51) Int. Cl.
*B60R 21/00* (2006.01)

(52) U.S. Cl. .................................... 180/268

(58) Field of Classification Search ................ 280/735, 280/802, 807; 180/268
See application file for complete search history.

(56) References Cited

U.S. PATENT DOCUMENTS

| | | | |
|---|---|---|---|
| 4,784,407 A * | 11/1988 | Verellen et al. | ............. 280/804 |
| 5,558,370 A * | 9/1996 | Behr | ......................... 280/806 |
| 5,873,599 A * | 2/1999 | Bauer et al. | ................. 280/806 |
| 6,257,363 B1 * | 7/2001 | Midorikawa et al. | ........ 180/268 |
| 6,360,981 B1 | 3/2002 | Specht | |
| 6,374,938 B2 | 4/2002 | Yano et al. | |
| 6,485,057 B1 | 11/2002 | Midorikawa et al. | |
| 6,729,650 B2 | 5/2004 | Midorikawa et al. | |
| 6,997,474 B2 * | 2/2006 | Midorikawa et al. | ........ 280/735 |
| 7,040,444 B2 * | 5/2006 | Midorikawa et al. | ........ 180/286 |
| 7,308,348 B2 * | 12/2007 | Tanaka et al. | ................. 701/45 |
| 7,516,808 B2 * | 4/2009 | Tanaka | ....................... 180/268 |
| 2005/0154517 A1 | 7/2005 | Tanaka et al. | |
| 2006/0065771 A1 | 3/2006 | Takao et al. | |

FOREIGN PATENT DOCUMENTS

| | | |
|---|---|---|
| GB | 2 335 890 A | 10/1999 |
| GB | 2 337 127 A | 11/1999 |
| JP | 2001-253317 | 9/2001 |
| JP | 2002-173000 | 6/2002 |
| JP | 2005-280497 | 10/2005 |

OTHER PUBLICATIONS

U.S. Appl. No. 11/444,427, filed Jun. 1, 2006, Koji Tanaka.
U.S. Appl. No. 11/444,434, filed Jun. 1, 2006, Koji Tanaka.

* cited by examiner

*Primary Examiner*—Faye M. Fleming
(74) *Attorney, Agent, or Firm*—Foley & Lardner LLP

(57) ABSTRACT

The seat belt retractor is provided that comprises an electric motor; a spool operatively associated with the electric motor for winding and unwinding a seat belt for occupant restraint; and a controller. The controller can be configured to control a drive of the electric motor based on a seat belt storage starting condition defined by information about a state of the seat belt relative to a vehicle occupant and information about a state of a vehicle door corresponding to the seat belt. The controller can be configured to control the drive of the electric motor to rotate the spool to wind up the seat belt when the seat belt storage starting condition is satisfied and to temporarily stop the rotation of the spool for a time period when a seat belt load acting on the seat belt exceeds a predetermined amount. The time period can be set according to a satisfaction pattern of the seat belt storage starting condition.

12 Claims, 5 Drawing Sheets

SEAT BELT APPARATUS

BACKGROUND

The present invention relates to a technology for developing a seat belt retractor to be installed in a vehicle.

Conventionally, a seat belt apparatus which is designed for protecting and restraining a vehicle occupant by a seat belt (webbing) is known. For example, Japanese translation of PCT international application No. 2003-507252 (incorporated by reference herein) discloses a seat belt apparatus having a seat belt retractor with a spool or winding shaft, which is driven by an electric motor to rotate so as to wind or unwind a seat belt.

The seat belt retractor disclosed in PCT international application No. 2003-507252 is a structure in which the action of winding the seat belt onto the spool is conducted by the electric motor. However, when this structure is used for winding up a seat belt for the purpose of preventing the seat belt from being kept in an unwound state, i.e., a "seat belt storage winding action," the action of winding up the seat belt onto the spool is required to be smoothly conducted according to a suitable control for the electric motor.

Specifically, during the seat belt storage winding action, the seat belt may be caught on a vehicle occupant or a vehicle seat or the seat belt may be withdrawn by the vehicle occupant. There is a solution to this situation, which is, when the load of the seat belt is increased (by detecting an increase in the motor current) during the seat belt storage winding action, a control to temporarily stop the seat belt storage winding action is engaged until the factor increasing the load is removed and then the seat belt storage winding action is restarted. However, when the seat belt is caught on the vehicle occupant or the vehicle seat, not much time is required to release the caught seat belt. In fact, if the seat belt storage winding action is stopped for a time longer than necessary, there is a possibility that the seat belt or the tongue is jammed in a vehicle door. On the other hand, when the seat belt is withdrawn by the vehicle occupant, a longer time period may be required for the seat belt withdrawing operation by the vehicle occupant. Therefore, if the seat belt storage winding action is stopped only for a short time period, the seat belt storage winding action operates against the seat belt withdrawing operation. Thus, there is a problem that the vehicle occupant may be made to feel uncomfortable. To streamline the seat belt storage winding action, it may be required to temporarily stop the seat belt storage winding action and to set the time interval of stoppage to a suitable time commensurate with the factor causing the increase to the seat belt load.

SUMMARY

The present invention relates to a seat belt storage winding action of a seat belt retractor, to be installed in a vehicle, using an electric motor for the purpose of preventing the seat belt from being kept in the unwound state. The object of the present invention is to provide a technology effective for streamlining the seat belt storage winding action.

The present invention can be typically adapted to a seat belt retractor to be installed in an automobile. In addition, the present invention can be adapted to a technology for developing a seat belt retractor to be installed in a vehicle other than the automobile, such as an aircraft, a boat, a train, and a bus.

First Embodiment of the Present Invention

The first embodiment of the present invention is a seat belt retractor to be installed in a vehicle and can comprise at least an electric motor, a spool, and a controller.

The spool can be a member which is operated in association with the drive of the electric motor to wind or unwind a seat belt for occupant restraint. The seat belt capable of being wound onto and unwound from the spool can be a long belt to be worn by a vehicle occupant seated in a seat and is sometimes called "webbing." Typically, the vehicle occupant seated in the vehicle seat is restrained by the seat belt when restraint is required such as during a vehicle collision. If required, a power transmission mechanism may be suitably disposed between the electric motor and the spool to selectively achieve a connected state where the electric motor and the spool are connected and a disconnected state where the connected state is cancelled. Also, the seat belt winding action by the spool may be conducted only by the driving force of the electric motor or by the winding force of an elastic member such as a return spring acting on the spool and the driving force of the electric motor is a secondary force.

The controller can be adapted at least for controlling the drive of the electric motor and controlling the driving direction, the driving time, and the driving force of the electric motor. The controller can typically comprise a CPU (central processing unit), an input/output unit, a storage unit, a peripheral unit, and the like. The controller may be provided exclusively for the seat belt retractor or may also be used for other control functions, such as controlling the driving system and/or the electric system of the vehicle.

A seat belt storage starting condition can be defined by the information about the state of the seat belt relative to a vehicle occupant, such as whether or not the seat belt is worn, and the information about the state of a vehicle door corresponding to the seat belt, such as whether or not the door is open. When the seat belt storage starting condition is satisfied, the controller can control the drive of the electric motor to rotate the spool to wind up the seat belt. The driving control enables an action winding up the seat belt onto the spool, the so-called "seat belt storage winding action," while preventing the seat belt from being kept in the unwound state from the spool.

During the seat belt storage winding action, the seat belt may be caught on a vehicle occupant or a vehicle seat or the seat belt may be withdrawn by the vehicle occupant. During the seat belt storage winding action, when the seat belt load acting on the seat belt is increased during the driving control of the electric motor, the controller can be adapted to temporarily stop or halt the driving control until the factor increasing the load is removed. With regard to the stoppage of the driving control, the controller can be required to change the suitable stoppage time between the cases where the factor increasing the seat belt load is the seat belt being caught on the vehicle occupant or the vehicle seat and the cases where the factor is the vehicle occupant withdrawing the seat belt. That is, when the seat belt is caught on the vehicle occupant or the vehicle seat, not much time is required to release the seat belt from being caught. In fact, if the seat belt storage winding action is stopped for a time longer than necessary, there is a possibility that the seat belt or a tongue would be jammed in the vehicle door. On the other hand, when the seat belt is withdrawn by the vehicle occupant, a longer time period is required for the seat belt withdrawing operation by the vehicle occupant. Therefore, if the seat belt storage winding action is stopped only for a short time period, the seat belt storage winding action operates against the seat belt withdrawing operation, i.e., there is a problem that the vehicle occupant may be made to feel uncomfortable.

The seat belt storage winding action can be temporarily stopped by stopping the drive of the electric motor as the load of the seat belt is increased during the seat belt storage winding action, and the time period or interval of the stoppage is set to be a suitable time period commensurate with the factor increasing the seat belt load. That is, the start of the seat belt storage action is defined by the combination of the state of the seat belt relative to the vehicle occupant (the worn state or the wearing-cancelled state) and the state of the vehicle door (the open state or the closed state), and the stoppage time period can be varied according to the satisfaction pattern of the starting condition for the seat belt storage winding action. The satisfaction patterns of the starting condition for the seat belt storage winding action may be suitably set according to the combination of the state of the seat belt and the state of the vehicle door. The number of satisfaction patterns can be set according to need.

With regard to the satisfaction of the seat belt storage starting condition, the seat belt storage starting condition can be satisfied when the seat belt is changed from the worn state to the wearing-cancelled state relative to the vehicle occupant or when there is the detection that the seat belt is in the wearing-cancelled state relative to the vehicle occupant. The following satisfaction patterns of the seat belt storage starting condition may be employed: a pattern that the seat belt is changed from the worn state to the wearing-cancelled state, a pattern that the seat belt is changed from the worn state to the wearing-cancelled state and the vehicle door is in the open state, a pattern that the vehicle door is changed from the open state to the closed state and the seat belt is in the wearing-cancelled state, and a pattern that the vehicle door is changed from the closed state to the open state and the seat belt is in the wearing-cancelled state.

As mentioned above, the seat belt storage winding action can be temporarily stopped when the seat belt load is increased during the seat belt storage winding action, and the stoppage time period is set to a suitable time period commensurate with the factor increasing the seat belt load, thereby enabling the streamlining of the seat belt storage winding action. Accordingly, a seat belt retractor capable of streamlining the seat belt storage winding action can be provided.

Second Embodiment of the Present Invention

The second embodiment of the present invention can be a seat belt retractor in which, in the case of a first satisfaction pattern of the seat belt storage starting condition where the vehicle door corresponding to the seat belt is in the open state when the wearing of the seat belt relative to the vehicle occupant is cancelled, the controller can control the drive of the electric motor to rotate the spool to wind up the seat belt and can set the stoppage time period of the electric motor to a first stoppage time period. On the other hand, in case of a second satisfaction pattern of the seat belt storage starting condition where the vehicle door corresponding to the seat belt is in the closed state when the wearing of the seat belt relative to the vehicle occupant is cancelled, the controller can control the drive of the electric motor to rotate the spool to wind up the seat belt and can set the stoppage time period of the electric motor to a second time period longer than the first time period. In other words, the stoppage time period in the case of the first satisfaction pattern of the seat belt storage starting condition can be shorter than the stoppage time period in the case of the second satisfaction pattern of the seat belt storage starting condition.

The stoppage time period for the first satisfaction pattern of the seat belt storage starting condition can be set based on the idea that when the vehicle door is in the open state, there is less possibility that the factor increasing the seat belt load is the operation of withdrawing the seat belt by the vehicle occupant, and there is high possibility that the factor is that the seat belt is caught on the vehicle occupant or the vehicle seat so that not much time is required to release the caught seat belt. Therefore, the controller can prevent the seat belt storage winding action from being stopped for a time longer than necessary, thereby preventing the occurrence of the seat belt or the tongue being jammed in the vehicle door. The stoppage time period for the second satisfaction pattern of the seat belt storage starting condition can be set based on the idea that when the vehicle door is in the closed state, there is a high possibility that the factor increasing the seat belt load is the operation of the withdraw of the seat belt by the vehicle occupant so that longer time is required for the withdrawing operation. Therefore, the controller can prevent the seat belt storage winding action from being conducted against the seat belt withdrawing operation, thereby preventing the vehicle occupant from being made to feel uncomfortable.

According to the second embodiment, with regard to the stoppage of the driving control of the electric motor when the seat belt load is increased, the stoppage time period in the case of the first satisfaction pattern of the seat belt storage starting condition can be set to be shorter than the stoppage time period in the case of the second satisfaction pattern of the seat belt storage starting condition, thereby setting a suitable stoppage time period commensurate with the factor increasing the seat belt load, and thus streamlining the seat belt storage winding action.

Third Embodiment of the Present Invention

The third embodiment of the present invention can be a seat belt retractor wherein, in the cases of a satisfaction pattern of the seat belt storage starting condition where the wearing of the seat belt is cancelled when the vehicle door corresponding to the seat belt is closed, the controller can set the stoppage time period of the electric motor to be longer than a reference stoppage time period.

The stoppage time period for the satisfaction pattern of the seat belt storage starting condition can be set based on the idea that when the vehicle door is in the closed state, there is a high possibility that the factor increasing the seat belt load is the operation of withdrawing the seat belt by the vehicle occupant so that longer time is required for the withdrawing operation. Therefore, it can prevent the seat belt storage winding action from being conducted against the seat belt withdrawing operation, thereby preventing the vehicle occupant from being made to feel uncomfortable.

According to the third embodiment, with regard to the stoppage of the driving control of the electric motor when the seat belt load is increased, the stoppage time period in the case where the wearing of the seat belt is cancelled relative to the vehicle occupant when the vehicle door corresponding to the seat belt is closed can be set to be longer than a reference stoppage time period, thereby enabling the setting of a suitable stoppage time period commensurate with the factor increasing the seat belt load and thus streamlining the seat belt storage winding action.

Fourth Embodiment of the Present Invention

The fourth embodiment of the present invention can be a seat belt retractor wherein, in the case of a satisfaction pattern of the seat belt storage starting condition where the wearing of the seat belt is cancelled when the vehicle door corresponding to the seat belt is opened, the controller can set the stoppage time period of the electric motor to be shorter than a reference stoppage time period.

The stoppage time period for the satisfaction pattern of the seat belt storage starting condition can be set based on the idea that when the vehicle door is in the open state, there is less possibility that the factor increasing the seat belt load is the operation of withdrawing the seat belt by the vehicle occupant and there is a high possibility that the factor is the seat belt being caught on the vehicle occupant or the vehicle seat so that not much time is required to release the seat belt from being caught. Therefore, the controller can prevent the seat belt storage winding action from being stopped for a time longer than necessary, thereby preventing the occurrence of the seat belt or the tongue being jammed in the vehicle door.

According to the fourth embodiment, with regard to the stoppage of the driving control of the electric motor when the seat belt load is increased, the stoppage time period in the case where the wearing of the seat belt is cancelled relative to the vehicle occupant when the vehicle door corresponding to the seat belt is opened can be set to be shorter than a reference stoppage time period, thereby enabling the setting of a suitable stoppage time period commensurate with the factor increasing the seat belt load and thus streamlining the seat belt storage winding action.

Fifth Embodiment of the Present Invention

The fifth embodiment of the present invention can be a seat belt apparatus to be installed in a vehicle and can comprise at least a seat belt for occupant restraint, an electric motor, a spool, a controller, a seat belt buckle, a tongue, a buckle detection sensor, and a current detection sensor.

The seat belt can be a long belt to be worn by a vehicle occupant seated in a seat. Typically, the vehicle occupant seated in the vehicle seat is restrained by the seat belt when restraint is required, such as during a vehicle collision. The seat belt buckle can be a member fixed to a vehicle body. The tongue can be a member which is attached to the seat belt and is latched to the seat belt buckle when the seat belt is worn by the vehicle occupant. The buckle detection sensor can detect that the tongue is latched to the seat belt buckle. The current detection sensor can detect the current value of the electric motor. The electric motor and the spool can have substantially the same functions as those of the seat belt retractor of the first embodiment.

The controller can determine whether or not the seat belt is worn by a vehicle occupant based on information detected by the buckle detection sensor. The seat belt storage starting condition is defined by information about the state of the seat belt relative to a vehicle occupant, i.e. whether or not the seat belt is worn, and the state of a vehicle door corresponding to the seat belt, i.e. whether or not the door is open. When the seat belt storage starting condition is satisfied, the controller can control the drive of the electric motor to rotate the spool so as to wind up the seat belt. When the controller determines that the seat belt load acting on the seat belt is increased based on the information from the current detection sensor during the seat belt storage winding action, the controller can be adapted to temporarily stop the driving control and can set the stoppage time period according to the satisfaction pattern of the seat belt storage starting condition. The controller may have substantially the same function as that of the controller of the first embodiment.

According to the fifth embodiment, the seat belt storage winding action can be temporarily stopped when the seat belt load is increased during the seat belt storage winding action by the seat belt apparatus and the stoppage time period can be set to a suitable time period commensurate with the factor increasing the seat belt load, thereby enabling the streamlining of the seat belt storage winding action. Accordingly, the embodiment can provide a seat belt apparatus capable of streamlining the seat belt storage winding action using the electric motor.

Sixth Embodiment of the Present Invention

The sixth embodiment of the present invention can be a seat belt apparatus that includes a controller with substantially the same structure as that of the controller in the seat belt retractor of the second embodiment.

Therefore, according to the sixth embodiment, with regard to the stoppage of the driving control of the electric motor when the seat belt load is increased, the stoppage time period in the case of the first satisfaction pattern of the seat belt storage starting condition can be set to be shorter than the stoppage time period in the case of the second satisfaction pattern of the seat belt storage starting condition, thereby enabling the setting of a suitable stoppage time period commensurate with the factor increasing the seat belt load and thus streamlining the seat belt storage winding action.

Seventh Embodiment of the Present Invention

The seventh embodiment of the present invention can be a seat belt apparatus comprising a controller with substantially the same structure as that of the controller in the seat belt retractor of the third embodiment.

Therefore, according to the seventh embodiment, with regard to the stoppage of the driving control of the electric motor when the seat belt load is increased, the stoppage time period in the case where the wearing of the seat belt is cancelled relative to the vehicle occupant when the vehicle door corresponding to the seat belt is closed can be set to be longer than the reference stoppage time period, thereby enabling the setting of a suitable stoppage time period commensurate with the factor increasing the seat belt load and thus streamlining the seat belt storage winding action.

Eighth Embodiment of the Present Invention

The eighth embodiment of the present invention can be a seat belt apparatus comprising a controller having substantially the same structure as that of the controller in the seat belt retractor of the fourth embodiment.

Therefore, according to the eighth embodiment, with regard to the stoppage of the driving control of the electric motor when the seat belt load is increased, the stoppage time period in the case where the wearing of the seat belt is cancelled relative to the vehicle occupant when the vehicle door corresponding to the seat belt is opened can be set to be shorter than the reference stoppage time period, thereby enabling the setting of the suitable stoppage time period commensurate with the factor increasing the seat belt load and thus streamlining the seat belt storage winding action.

Ninth Embodiment of the Present Invention

The ninth embodiment of the present invention can be a vehicle with a seat belt apparatus comprising at least a seat belt apparatus, such as in the fifth to eighth embodiments. In the vehicle, the seat belt apparatus can be accommodated in an accommodating space in the vehicle such as an accommodating space in a pillar, an accommodating space in a seat, or an accommodating space in another part of the vehicle.

Accordingly, the ninth embodiment can provide a vehicle comprising a seat belt apparatus which enables the streamlining of the seat belt storage winding action using the electric motor, wherein the seat belt apparatus is accommodated in an accommodating space in the vehicle.

As mentioned above, the embodiments of the present invention can enable the streamlining of the seat belt storage winding action using an electric motor. In a seat belt retractor to be installed in a vehicle, the seat belt storage winding action can be temporarily stopped by stopping the drive of the electric motor according to an increase of the seat belt load during the seat belt storage winding action, and the time period of the stoppage can be set to be a suitable time period commensurate with the factor increasing the seat belt load.

It is to be understood that both the foregoing general description and the following detailed descriptions are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

DETAILED DESCRIPTION

Figure 1:
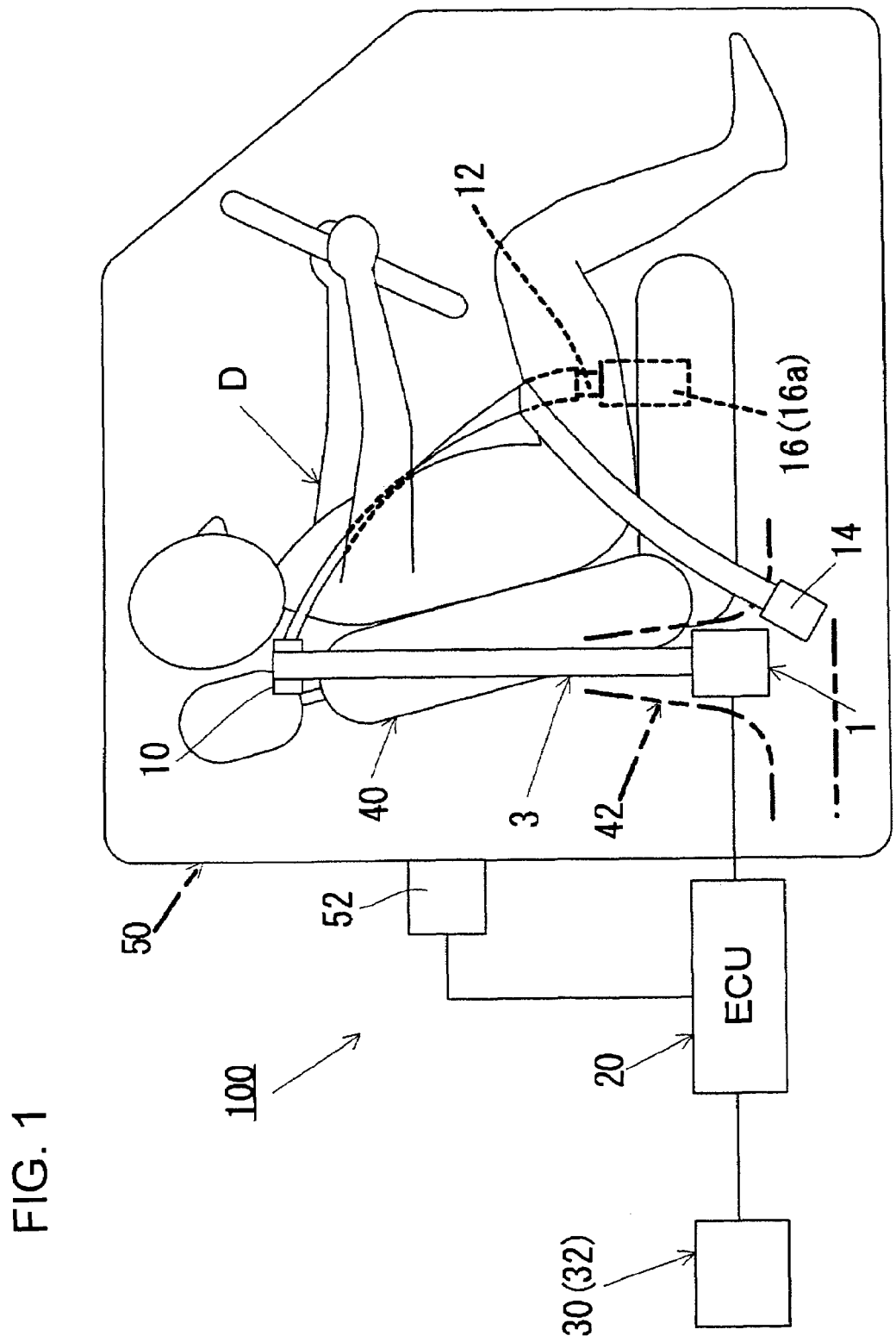
FIG. 1 is a schematic drawing showing a seat belt apparatus 100 according to an embodiment of the present invention.
Figure 2:
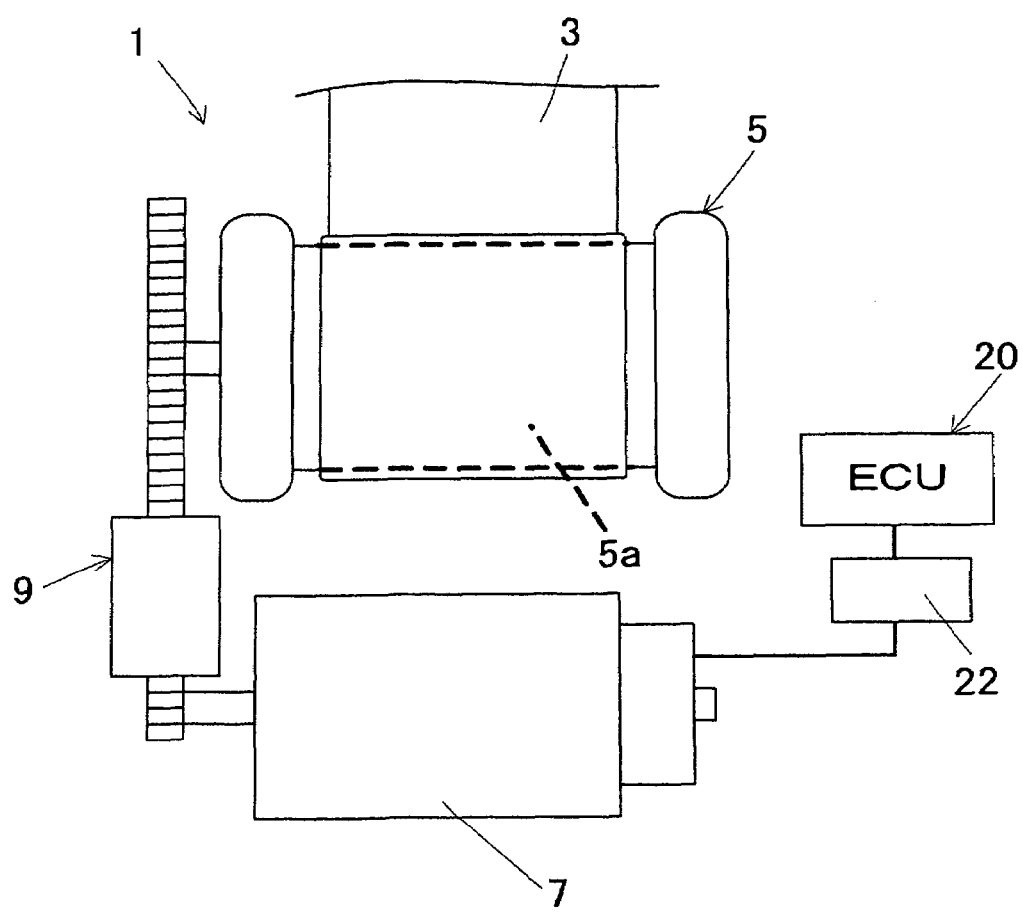
FIG. 2 is a schematic drawing showing the seat belt retractor 1 of FIG. 1.

Hereinafter, embodiments of the present invention will be described in detail with reference to the drawings. First, description will be made of a seat belt apparatus 100 with reference to FIG. 1 and FIG. 2. FIG. 1 is an illustration schematically showing the entire structure of the seat belt apparatus 100 according to an embodiment of the present invention. FIG. 2 is an illustration showing the schematic structure of the seat belt retractor 1 shown in FIG. 1.

As shown in FIG. 1, the seat belt apparatus 100 can be a seat belt apparatus for a vehicle, such as an automotive vehicle. The seat belt apparatus 100 can comprise mainly of a seat belt retractor 1, a seat belt 3, a deflection fitting 10, a tongue 12, an outer anchor 14, a seat belt buckle 16, and an ECU 20. In addition, an input element 30 is installed in the vehicle to detect information about collision predictions or collision occurrences of the vehicle, information about the driving state of the vehicle, information about the sitting position and the body size of a vehicle occupant seated in a seat, information about the traffic conditions around the vehicle, information about the weather conditions and about time zone, and the like and to input such detected information to the ECU 20. The detected information of the input element 30 is transmitted to the ECU 20 anytime or at predetermined intervals and can be used for the operational control of the seat belt apparatus 100 and the like.

The input element 30 can include a collision information detection sensor 32 for detecting information about a vehicle collision such as a prediction of a vehicle collision and an occurrence of an actual vehicle collision. The collision information detection sensor 32 can be a sensor capable of detecting or measuring information about the distance, the speed, and the acceleration of a collision object (such as another vehicle, an obstacle, a pedestrian, or the like) relative to the subject vehicle and also detecting or measuring accelerations in three-axial directions (X-axis, Y-axis, and Z-axis). The collision information detection sensor 32 may comprise a single detection sensor or a plurality of detection sensors. Specifically, a millimeter wave radar, a laser radar, an acceleration sensor, and a camera sensor may be used as the collision information detection sensor 32.

A vehicle door sensor 52 can be mounted on the vehicle and can be adapted to detect the opening/closing state of a vehicle door 50, i.e., detect whether the vehicle door 50 is in the open state or closed state. For example, a contact sensor can be used as the vehicle door sensor 52, which comprises a first contact on the vehicle door side and a second contact on a vehicle pillar side. The contact sensor can detect the opening/closing of the vehicle door according to the contact between the first contact and the second contact. The vehicle door sensor 52 may be considered as a component of the seat belt retractor 1 or the seat belt apparatus 100. The information detected by the vehicle door sensor 52 can be transmitted to the ECU 20 and can be used in the "retractor control process A," the "retractor control process B," and the "retractor control process C" as will be described later.

The seat belt 3 can be a long belt to be used for restraining a vehicle occupant D (such as the driver) seated in a vehicle seat 40 (such as a driver's seat). The seat belt 3 can be withdrawn from the seat belt retractor 1 fixed relative to the vehicle and can extend through a deflection fitting 10 provided around an area about the shoulder of the vehicle occupant D and is connected to an outer anchor 14 through a tongue 12. The deflection fitting 10 has a function of holding the seat belt 3 to the area about the shoulder of the occupant D and guiding the seat belt 3. By inserting or latching the tongue 12 to a seat belt buckle 16 fixed to the vehicle body, the seat belt 3 goes into the state of being worn by the vehicle occupant D.

The seat belt buckle 16 can have a built-in buckle switch 16a. The buckle switch 16a may be a sensor adapted to detect that the tongue 12 is inserted into or latched to the seat belt buckle 16. That is, the buckle switch 16a detects the buckle ON operation (i.e., the switch detects that the seat belt goes into the worn state). The information detected by the buckle switch 16a can be transmitted to the ECU 20 which determines whether the seat belt 3 is in the worn state or in the wearing-cancelled state.

The seat belt retractor 1 can be a device capable of performing the action of winding or unwinding the seat belt 3 via a spool 5 and a motor 7 as will be described later. The retractor 1 can be installed in an accommodating space in a B-pillar 42 of the vehicle in the embodiment shown in FIG. 1.

The ECU 20 can have a function of operating the control of the seat belt retractor 1 and other operational mechanisms based on the input signals from the input element 30 and may comprise a CPU (central processing unit), an input/output unit, a storage unit, a peripheral unit, and the like. In particular, the ECU 20 can control the motor 7 of the seat belt retractor 1, as will be described later. Specifically, the ECU 20 can control the amount of current supplied to an electromagnetic coil of the motor 7 and the direction of the current supply so as to vary the rotational speed, the rotational direction, the rotational period of time, and the rotational torque (or output) of a shaft of the motor 7. The ECU 20 can be structured to control the drive of the motor 7 and to control a power transmission mechanism 9, as will be described later, to switch between the state where the power of the motor 7 is transmitted to the spool 5 and the state where the power is not transmitted to the spool 5. The ECU 20 may be exclusive to the seat belt retractor 1 or may be used as the controller for controlling the driving system and/or electric system.

As shown in FIG. 2, the seat belt retractor 1 can mainly comprise the spool 5, the motor 7, and the power transmission mechanism 9.

The spool 5 can be formed in a columnar or cylindrical shape of which the outer periphery (or its seat belt contact face) functions as the wind-up surface on which the seat belt 3 is wound. The spool 5 can perform the action of winding the seat belt 3 onto the wind-up surface 5a by rotating in the seat belt winding direction and also can perform the action of unwinding the seat belt 3 from the wind-up surface 5a by rotating in the seat belt unwinding direction.

The motor 7 may be structured as an electric motor and can be adapted to transmit power to the spool 5 through the power transmission mechanism 9. The motor 7 rotates in such a direction that the spool 5 performs the action of winding the seat belt 3 when the motor is controlled to rotate in the seat belt winding direction, and the motor 7 rotates in such a direction that the spool 5 performs the action of unwinding the seat belt 3 when the motor is controlled to rotate in the seat belt unwinding direction. The seat belt retractor 1 can also be provided with a motor current detector or sensor 22 for detecting the current value of the motor 7. The information about the current value detected by the motor current detector 22 is transmitted to the ECU 20 and is used for determining the increase in seat belt load.

The power transmission mechanism 9 can be arranged between the spool 5 and the motor 7 and can function as a mechanism capable of being in a connected state where the spool 5 and the motor 7 are connected (also called the "power transmission operation mode") and a disconnected state where the connected state is cancelled (also called the "power transmission disconnection mode"). The power transmission mechanism 9 can sometimes be referred to as a so-called "clutch" which is composed of a combination of gears. The connected state of the power transmission mechanism 9 is a state where the power of the motor 7 is allowed to be transmitted to the spool via the power transmission mechanism 9. When the motor 7 is controlled to rotate in this connected state, the power of the motor 7 is transmitted to the spool 5 via the power transmission mechanism 9. During the connected state, the rotational speed of the motor 7 can be reduced by the power transmission mechanism 9. On the other hand, in the disconnected state of the power transmission mechanism 9, the physical connection between the spool 5 and the motor 7 is cancelled or terminated so as to allow the easy manual unwinding or withdrawing of the seat belt 3 from the spool 5. Alternatively, the spool 5 and the motor 7 may be directly connected without the power transmission mechanism 9 between the spool 5 and the motor 7, if required.

Even though it is not shown in the figures, the power transmission mechanism 9 may be constructed as a so-called "single-stage clutch." Accordingly, when the motor 7 is controlled to rotate with a predetermined motor output in the power transmission operation mode of the power transmission mechanism 9, the rotation of the motor 7 is transmitted to the spool 5 with the rotational speed being reduced so that the spool 5 is driven to rotate with a predetermined torque at a predetermined rotational speed. Instead of the power transmission mechanism 9, a power transmission mechanism capable of changing the rotational torque and the rotational speed of the spool into several stages may be employed. For example, in the case of a two-stage clutch capable of changing the rotational torque and the rotational speed of the spool into two stages, the power transmission mechanism can be set in a high-reduction ratio mode with a relatively high rotational torque and a relatively low rotational speed in order to respond to a need for the winding of the seat belt onto the spool with a large belt tension. On the other hand, the power transmission mechanism can be set in a low-reduction ratio mode with a relatively low rotational torque and a relatively high rotational speed in order to respond to a need for the rapid winding of the seat belt onto the spool.

The seat belt retractor 1 can have the following seven seat belt control modes relating to the state of the seat belt 3. For these seat belt control modes, the control of the motor 7 and the power transmission mechanism 9 can be performed by the ECU 20. Another seat belt control mode may be added to these seven seat belt control modes.

(1) Belt Storage Mode

The belt storage mode is a control mode in which the seat belt 3 is not used and fully wound onto the spool 5. In the belt storage mode, the motor 7 is not activated and the power transmission mechanism 9 is set to the power transmission disconnection mode. Therefore, only a very weak belt tension is applied to the seat belt 3 and the power consumption is zero.

(2) Belt Withdrawing Mode

The belt withdrawing mode is a control mode in which the seat belt 3 is withdrawn from the spool 5 so as to be worn by the occupant. The seat belt retractor 1 in the belt withdrawing mode is also set in the power transmission disconnection mode. Therefore, the seat belt 3 can be withdrawn manually with a small force. Also, the motor 7 is not activated so that the power consumption is zero.

(3) Belt Winding and Fitting Mode

The belt winding and fitting mode is a control mode in which, after the seat belt 3 is withdrawn and the tongue 12 is inserted into and latched with the seat belt buckle to turn ON the buckle switch 16a, the excess withdrawn part of the seat belt 3 is wound onto the spool in order to fit the seat belt 3 onto the occupant. Also, the belt winding and fitting mode is a control mode in which, when the occupant moves so as to withdraw a predetermined amount of the seat belt 3 from the normally used state of the seat belt 3 (at this point, the buckle switch is in the ON state) and then the occupant returns to the original position, the withdrawn part of the seat belt 3 is wound onto the spool. In the belt winding and fitting mode, the power transmission mechanism 9 is set to the power transmission operation mode and the motor 7 is controlled to rotate at a high rotational speed in the belt winding direction. Therefore, the seat belt 3 is rapidly wound onto the spool 5 and then the motor 7 is stopped when a very small predetermined belt tension is generated, whereby the seat belt 3 is worn by and fitted onto the occupant.

(4) Normal Wearing Mode (Comfortable Mode)

The normal wearing mode, or the comfortable mode, is a control mode in which the occupant wears the seat belt 3 in the normal state after the belt winding and fitting mode is terminated. In the normal wearing mode, the motor 7 is not activated and the power transmission mechanism 9 is set in the power transmission disconnection mode. Therefore, only a very weak belt tension is applied to the seat belt 3 so that the vehicle occupant can wear the seat belt 3 without any stress. In addition, the power consumption is zero.

(5) Warning Mode

The warning mode is a control mode in which, when the system detects the driver dozing during operation or detects an obstacle around the vehicle when the vehicle is operating and the seat belt is in the normal wearing mode, the seat belt 3 is wound repeatedly a predetermined number of times so as to warn the driver. In the warning mode, the motor 7 is controlled to be alternately activated and stopped several times. Therefore, the operation of applying a relatively strong belt tension (which is weaker than that of the belt tension during the emergency mode as will be described later) and a very weak belt tension onto the seat belt 3 is alternately repeated, thereby drawing the driver's attention to the driver's dozing or the obstacle around the vehicle.

(6) Emergency Mode

The emergency mode is a control mode which is set when the vehicle is extremely likely to have a collision with an obstacle or the like during the operation in the normal wearing mode or following the warning mode. In the emergency mode, the power transmission mechanism 9 is set in the power transmission operation mode and the motor 7 is controlled to rotate at a high rotational speed with a high rotational torque in the belt winding direction. Therefore, the motor 7 is stopped when a predetermined extremely strong belt tension is generated on the seat belt 3 after the seat belt 3 is rapidly wound onto the spool 5, thereby securely restraining the vehicle occupant with the seat belt 3.

(7) Belt Winding and Storing Mode

The belt winding and storing mode is a control mode in which the seat belt 3 is fully wound so as to be in the storage state. In the belt winding and storing mode, the power transmission mechanism 9 is set to the power transmission operation mode and the motor 7 is controlled to rotate in the belt winding direction so as to wind up the seat belt onto the spool 5. Consequently, the action of winding up the withdrawn seat belt 3 onto the spool 5 (i.e., the "seat belt storage winding action") is conducted, thereby preventing the seat belt 3 from being kept in the unwound state from the spool 5. The motor 7 is stopped when the seat belt 3 is fully wound and a predetermined belt tension, which is very weak, occurs, whereby the seat belt 3 goes into the belt storage mode in which the very weak belt tension is applied to the seat belt 3.

With regard to the belt winding and storing mode, the seat belt 3 may be caught on the vehicle occupant or the vehicle seat or the seat belt 3 may be withdrawn by the vehicle occupant when the belt storage winding mode is conducted. For these circumstances, this seat belt retractor can be adapted to repeat the control of stopping the seat belt storage winding action for a predetermined time period from when the seat belt load is increased during the seat belt storage winding action to when the factor increasing the load is eliminated and, after that, restarting the seat belt storage winding action. That is, when the seat belt load is increased during the seat belt storage winding action, an interval is provided for stopping the seat belt storage winding action for a predetermined time period. The increase in seat belt load is determined by the ECU 20 based on the current value of the motor 7 detected by the motor current detector 22 shown in FIG. 2. Specifically, when the current value of the motor 7 exceeds the reference value during the seat belt storage winding action, it is determined that the seat belt 3 is caught on the vehicle occupant or the vehicle seat or that the seat belt is withdrawn by the vehicle occupant, i.e., in the "increased load state."

The suitable value of the interval varies between the cases where the factor increasing the seat belt load is the seat belt being caught on the vehicle occupant or the vehicle seat and the cases where the factor is the seat belt withdrawing operation by the vehicle occupant. That is, when the seat belt 3 is caught on the vehicle occupant or the vehicle seat, not much time is required to release the seat belt from being caught. In fact, if the seat belt storage winding action is stopped for a time longer than necessary, there is a possibility that the seat belt 3 or the tongue 12 is jammed in the vehicle door. On the other hand, when the seat belt 3 is withdrawn by the vehicle occupant, a longer time is required for the seat belt withdrawing operation by the vehicle occupant. Therefore, if the seat belt storage winding action is stopped only for a short time period, the seat belt storage winding action may operate against the seat belt withdrawing operation. Thus, there is a problem that the vehicle occupant may be made to feel uncomfortable.

Accordingly, the seat belt retractor can be adapted to temporarily stop the seat belt storage winding action by stopping the drive of the motor 7 according to the increase of the seat belt load when the seat belt retractor is in the belt winding and storing mode and to set the time interval of stoppage to a suitable time commensurate with the factor increasing the seat belt load. Hereinafter, the control of the retractor will be described in detail with reference to FIG. 3 through FIG. 5.

Figure 3:
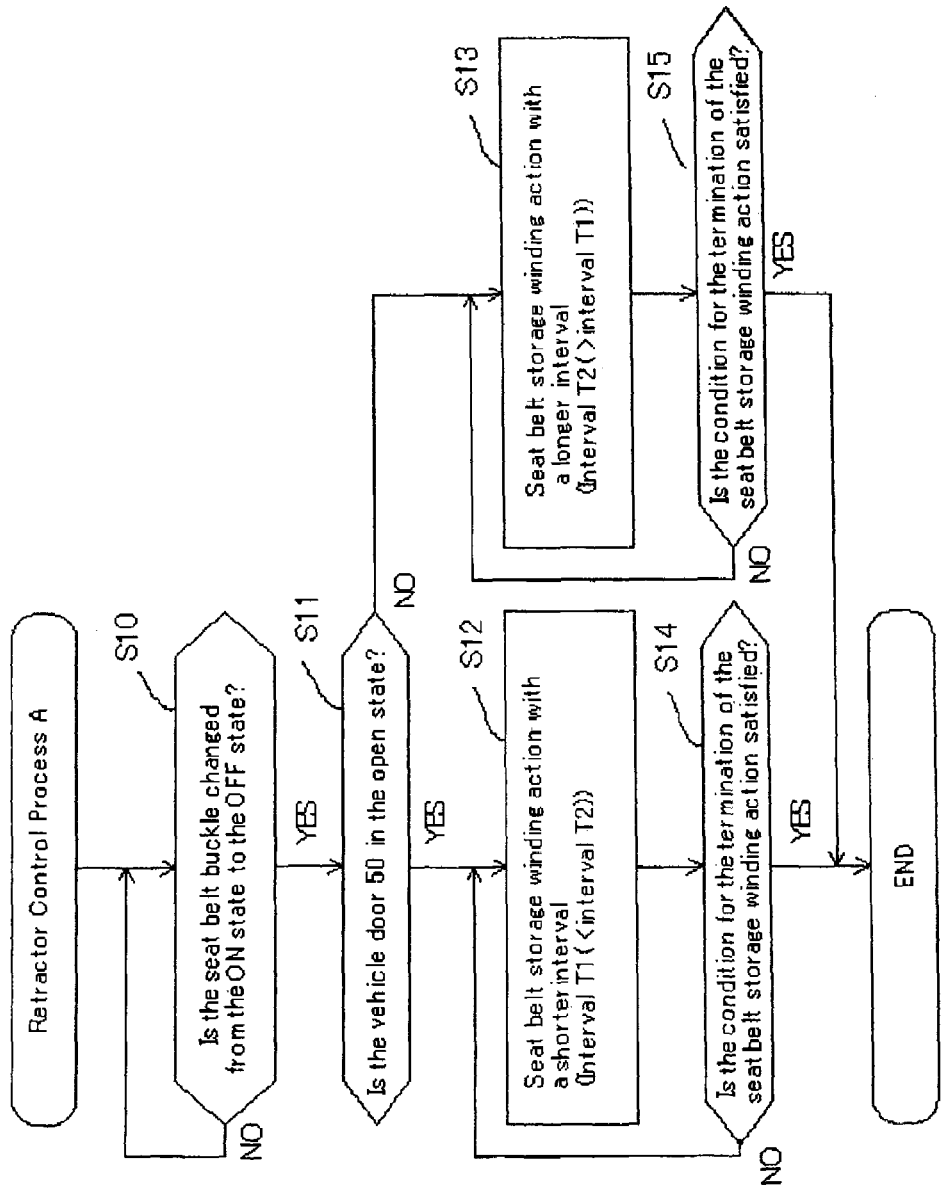
FIG. 3 is a flow chart showing the retractor control process A according to an embodiment of the present invention.

FIG. 3 shows a flow chart for the "retractor control process A." In the retractor control process A, the determination of whether or not the seat belt buckle is changed from the ON state to the OFF state is made in step S10. Specifically, when the release of the tongue 12 relative to the seat belt buckle 16 of FIG. 1 is detected by the buckle switch 16a, it is determined that the seat belt buckle is changed from the ON state to the OFF state, that is, that the seat belt 3 is changed from the worn state to the released state relative to the vehicle occupant. This determination is achieved by the ECU 20 which detects the information from the buckle switch 16a. The change of the seat belt 3 from the worn state to the released state means that the starting condition for seat belt storage is satisfied. The process continues in step S10 until the seat belt buckle is changed from the ON state to the OFF state and proceeds to step S11 where it is determined that the seat belt buckle is changed from the ON state to the OFF state (the YES path from step S10).

In step S11, it is determined whether or not the vehicle door 50 of FIG. 1 is in the open state. Specifically, based on the information detected by the vehicle door sensor 52 of FIG. 1, it is determined that the vehicle door 50 is in the open state when the vehicle door sensor is OFF. This determination is achieved by the ECU 20 which detects the information from the vehicle door sensor 52. When it is determined that the vehicle door 50 is in the open state (the YES path from step S11) so that the first satisfaction pattern of the start of the seat belt storage is established, the process proceeds to step S12. If not, i.e. when it is determined that the vehicle door 50 is in the closed state (the NO path from step S11) so that the second satisfaction pattern of the start of the seat belt storage is established, the process proceeds to step S13.

In step S12 and step S13, the power transmission mechanism 9 of the seat belt retractor 1 is set to the power transmission operation mode and the motor 7 is controlled to rotate the spool 5 to wind up the seat belt, thereby performing the seat belt storage winding action mentioned above. When it is determined that the seat belt load is increased because the value detected by the motor current detector 22 exceeds the reference current value during the seat belt storage winding action, an interval is provided for temporarily stopping the seat belt storage winding action for a predetermined time period.

Particularly in step S12, the seat belt storage winding action is conducted with a setting mode such that the interval for the temporal stoppage is set to be shorter than that of step S13 (i.e., a seat belt storage winding action with a shorter interval). As the stoppage time period or interval in step S12 is assumed as T1 and the stoppage time period or interval in step S13 is assumed as T2, the relationship T1<T2 is established. Therefore, the seat belt storage winding action and the winding stopping action are alternately conducted until the condition for the termination of the seat belt storage winding action is satisfied in step S14. It can be preferable that the stoppage time periods T1 and T2 are previously set based on the actual measurement of times required for the vehicle occupant to perform the operations for releasing the seat belt from being caught and for withdrawing the seat belt.

The setting in step S12 is based on the idea that, when the vehicle door 50 is in the open state in step S11, there is less possibility that the factor increasing the seat belt load is the operation of withdrawing the seat belt 3 by the vehicle occupant and there is a high possibility that the factor is the seat belt 3 being caught on the vehicle occupant or the vehicle seat so that not much time is required to release the seat belt from being caught. Therefore, the setting of step S12 can prevent the seat belt storage winding action from being stopped for a time longer than necessary, thereby preventing the occurrence of the jamming of the seat belt 3 or the tongue in the vehicle door 50.

On the other hand, in step S13, the seat belt storage winding action is conducted with such a setting mode that the interval for the temporal stoppage is set to be longer than that of step S12 (i.e., a seat belt storage winding action with a longer interval). Therefore, the seat belt storage winding action and the winding stopping action are alternately conducted until the condition for the termination of the seat belt storage winding action is satisfied in step S15.

The setting in step S13 is based on the idea that when the vehicle door 50 is in the closed state in step S11, there is a high possibility that the factor increasing the seat belt load is the operation of withdrawing the seat belt 3 by the vehicle occupant so that a longer time is required for the withdrawing operation. Therefore, the setting in step S13 can prevent the seat belt storage winding action from being operated against the seat belt withdrawing operation, thereby preventing the vehicle occupant from being made to feel uncomfortable.

In step S14, it is determined whether or not the condition for the termination of the seat belt storage winding action is satisfied in step S12. When it is determined that the condition is not satisfied (the NO path from step S14), the process returns to step S12. When it is determined that the condition is satisfied (the YES path from step S14), the retractor control process A is terminated. Similarly, in step S15, it is determined whether or not the condition for the termination of the seat belt storage winding action is satisfied in step S13. When it is determined that the condition is not satisfied (the NO path from step S15), the process returns to step S13. When it is determined that the condition is satisfied (the YES path from step S15), the retractor control process A is terminated. The satisfaction of the termination condition in step S14 or step S15 is judged based on the time from when the seat belt buckle goes in the OFF state, the number of repetitions of the seat belt storage winding action, and the winding stopping action in step S12 or step S13.

Figure 4:
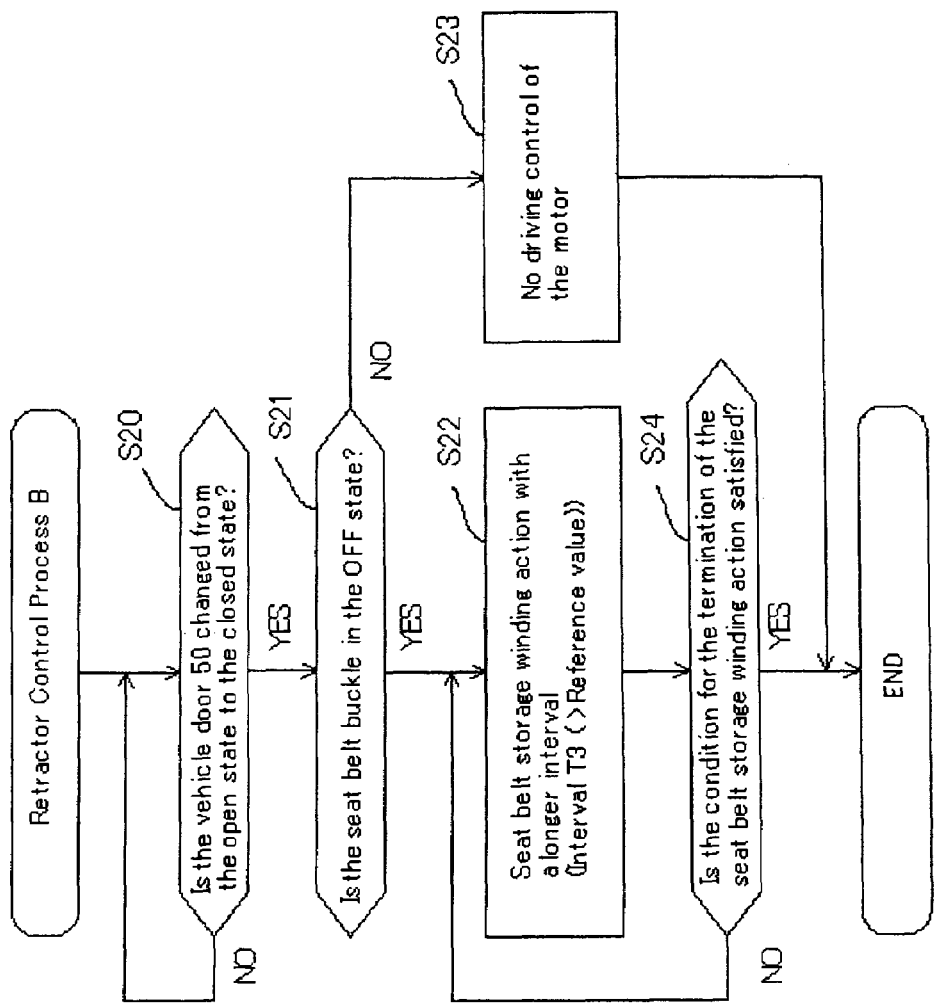
FIG. 4 is a flow chart showing the retractor control process B according to an embodiment of the present invention.

FIG. 4 shows a flow chart for the "retractor control process B." In the retractor control process B, whether or not the vehicle door 50 of FIG. 1 is changed from the open state to the closed state is determined in step S20. Specifically, when, based on the information detected by the vehicle door sensor 52, the sensor is changed from the OFF state to the ON state, it is determined that the vehicle door 50 is changed from the open state to the closed state. This determination is achieved by the ECU 20 which detects the information from the vehicle door sensor 52. The process continues in step S20 until the vehicle door 50 is changed from the open state to the closed state and then proceeds to step S21 (the YES path from step S20).

In step S21, whether or not the seat belt buckle is in the OFF state is determined. Specifically, when the release of the tongue 12 relative to the seat belt buckle 16 of FIG. 1 is detected by the buckle switch 16a, it is determined that the seat belt buckle is in the OFF state, that is, that the seat belt 3 is not worn by the vehicle occupant. This determination is achieved by the ECU 20 which detects the information from the buckle switch 16a. When it is determined that the seat belt buckle is in the OFF state in step S21 (the YES path from step S21), it is determined that the starting condition for seat belt storage is satisfied, that is, the satisfaction pattern of the start of the seat belt storage is established so that the process proceeds to step S22. If not, i.e., when it is determined that the seat belt buckle is in the ON state (the NO path from step S21), the process proceeds to step S23.

In step S22, the power transmission mechanism 9 of the seat belt retractor 1 is set to the power transmission operation mode and the motor 7 is controlled to rotate the spool 5 to wind up the seat belt, thereby performing the seat belt storage winding action. When it is determined that the seat belt load is increased because the value detected by the motor current detector 22 reaches the reference current value during the seat belt storage winding action, an interval is provided for temporarily stopping the seat belt storage winding action for a predetermined time period. The seat belt storage winding action is conducted with a setting mode such that the temporal stoppage time period T3 is set to be longer than a preset reference stoppage time period (a reference value) T0 (T3>T0) (i.e., a seat belt storage winding action with a longer interval). Therefore, the seat belt storage winding action and the winding stopping action are alternately conducted until the condition for the termination of the seat belt storage winding action is satisfied in step S24. It may be preferable that the stoppage time period T3 and the reference value are previously set based on the actual measurement of times required for the vehicle occupant to perform the operations for releasing the seat belt from being caught and for withdrawing the seat belt.

The setting in step S22 is based on the idea that when the vehicle door 50 is in the closed state, there is a high possibility that the factor increasing the seat belt load is the operation of withdrawing the seat belt 3 by the vehicle occupant so that a longer time is required for the withdrawing operation. Therefore, the seat belt storage winding action can be prevented from being operated against the seat belt withdrawing operation, thereby preventing the vehicle occupant from being made to feel uncomfortable.

On the other hand, in step S23, the motor 7 is set to be into the stopped state or is kept in the stopped state so as not to conduct the seat belt storage winding action because the seat buckle is in the ON state. During this stage, the power transmission mechanism 9 of the seat belt retractor 1 may be set in the power transmission operation mode or the power transmission disconnection mode. In step S23, the setting of the temporal stoppage time period is not conducted because the seat belt storage winding action is not conducted.

In step S24, similarly to step S14 and step S15 shown in FIG. 3, whether or not the condition for the termination of the seat belt storage winding action is satisfied is determined. When the condition is determined that the condition is not satisfied (the NO path from step S24), the process returns to step S22. When it is determined that the condition is satisfied (the YES path from step S24), the retractor control process B is terminated. The satisfaction of the termination condition in step S24 is judged based on the time from when the seat belt buckle goes to the OFF state, the number of repetitions of the seat belt storage winding action, and the winding stopping action in step S22.

Figure 5:
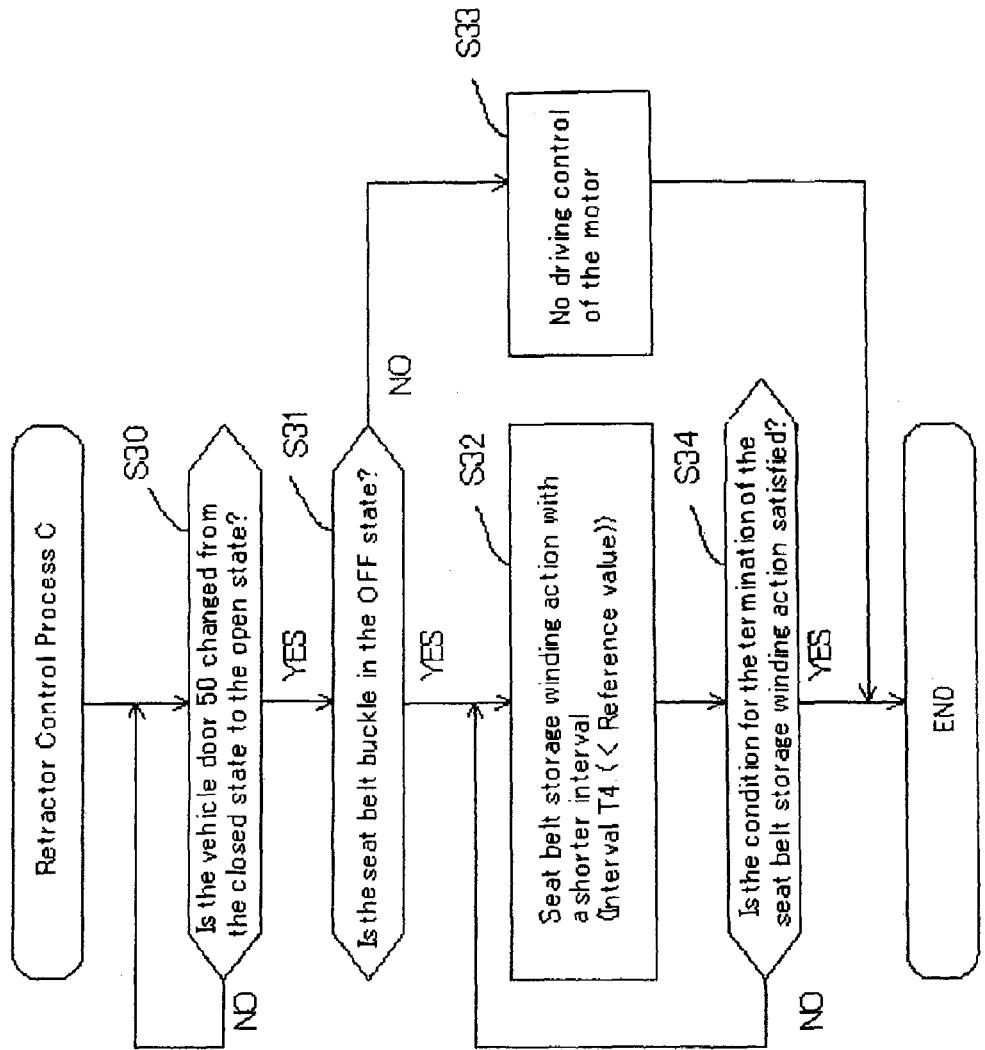
FIG. 5 is a flow chart showing the retractor control process C according to an embodiment of the present invention.

FIG. 5 shows a flow chart for the "retractor control process C." In the retractor control process C, whether or not the vehicle door 50 of FIG. 1 is changed from the closed state to the open state is determined in step S30. Specifically, when, based on the information detected by the vehicle door sensor 52 of FIG. 1, the sensor is changed from the OFF state to the ON state, it is determined that the vehicle door 50 is changed from the closed state to the open state. This determination is achieved by the ECU 20 which detects the information from the vehicle door sensor 52. The process continues in step S30 until the vehicle door 50 is changed from the closed state to the open state and then proceeds to step S31 (the YES path from step S30).

In step S31, whether or not the seat belt buckle is in the OFF state is determined. Specifically, when the release of the tongue 12 relative to the seat belt buckle 16 of FIG. 1 is detected by the buckle switch 16a, it is determined that the seat belt buckle is in the OFF state, that is, that the seat belt 3 is not worn by the vehicle occupant. This determination is achieved by the ECU 20 which detects the information from the buckle switch 16a. When it is determined that the seat belt buckle is in the OFF state in step S31 (the YES path from step S31), it is determined that the starting condition for seat belt storage is satisfied, that is, the satisfaction pattern of the start of the seat belt storage is established so that the process proceeds to step S32. If not, i.e. when it is determined that the seat belt buckle is in the ON state (the NO path from step S31), the process proceeds to step S33.

In step S32, the power transmission mechanism 9 of the seat belt retractor 1 is set to the power transmission operation mode and the motor 7 is controlled to rotate the spool 5 to wind up the seat belt, thereby performing the seat belt storage winding action. When it is determined that the seat belt load is increased because the value detected by the motor current detector 22 reaches the reference current value during the seat belt storage winding action, an interval is provided for temporarily stopping the seat belt storage winding action for a predetermined time period. The seat belt storage winding action is conducted with a setting mode such that the temporal stoppage time period T4 is set to be shorter than a preset reference stoppage time period (the reference value) T0 (T4<T0) (i.e., the seat belt storage winding action with a shorter interval). Therefore, the seat belt storage winding action and the winding stopping action are alternately conducted until the condition for the termination of the seat belt storage winding action is satisfied in step S34. It may be preferable that the stoppage time period T4 and the reference value are previously set based on the actual measurement of times required for the vehicle occupant to perform the operations for releasing the caught seat belt and for withdrawing the seat belt.

The setting in step S32 is based on the idea that when the vehicle door 50 is in the open state, there is less possibility that the factor increasing the seat belt load is the operation of withdrawing the seat belt 3 by the vehicle occupant and there is a high possibility that the factor is that the seat belt 3 is caught on the vehicle occupant or the vehicle seat so that not much time is required to release the seat belt from being caught. Therefore, the seat belt storage winding action from being stopped for a time longer than necessary can be prevented, thereby preventing the occurrence of the jamming of the seat belt 3 or the tongue in the vehicle door 50.

On the other hand, in step S33, the motor 7 is set to be in the stopped state or is kept in the stopped state so as not to conduct the seat belt storage winding action because the seat belt buckle is in the ON state. During this stage, the power transmission mechanism 9 of the seat belt retractor 1 may be set in the power transmission operation mode or the power transmission disconnection mode. The setting of the temporal stoppage time period in step S33 is not conducted because the seat belt storage winding action is not conducted.

In step S34, similarly to step S14 and step S15 of FIG. 3, whether or not the condition for the termination of the seat belt storage winding action is satisfied is determined. When it is determined that the condition is not satisfied (the NO path from step S34), the process returns to step S32. When it is determined that the condition is satisfied (the YES path from step S34), the retractor control process C is terminated. The satisfaction of the termination condition in step S34 is judged based on the time from when the seat belt buckle goes into OFF state, the number of repetitions of the seat belt storage winding action, and the winding stopping action in step S32.

As mentioned above, according to the retractor control process A, the retractor control process B, or the retractor control process C, the seat belt storage winding action is temporarily stopped according to the increase in the seat belt load during the seat belt storage winding action. The time period for the stoppage is suitably set to a proper time period commensurate with the factor increasing the seat belt load, thereby streamlining the seat belt storage winding action.

Therefore, a seat belt retractor 1, the seat belt apparatus 100, and the vehicle with the seat belt apparatus 100 is provided in which the seat belt storage winding action using the motor 7 is streamlined.

With reference to the aforementioned respective retractor control processes, the seat belt storage winding action by the spool may be conducted only by the driving force of the motor 7 or by the winding force of an elastic member such as a return spring acting on the spool 5 with the driving force of the motor 7 as a secondary force.

Also, the aforementioned retractor control processes A through C may be employed independently. Alternatively, any suitable combination thereof may be employed.

When the starting condition for seat belt storage which is defined by information about the state of the seat belt 3 relative to the vehicle occupant D and information about the state of the vehicle door 50 corresponding to the seat belt 3 is satisfied, the motor 7 is controlled to wind up the seat belt onto the spool 5 and the temporal stoppage time period is variably set according to the satisfaction pattern of the starting condition. That is, the start of the seat belt storage winding action is defined by the combination of the state of the seat belt 3 (the worn state or the wearing-cancelled state) and the state of the vehicle door 50 (the open state or the closed state) and the stoppage time period is varied according to the satisfaction pattern of the starting condition for the seat belt storage winding action. The satisfaction patterns of the starting condition for the seat belt storage winding action may be suitably set according to the combination of the state of the seat belt 3 and the state of the vehicle door 50. The number of the satisfaction patterns can be set according to need.

The present invention is not limited to the aforementioned embodiments, so various modifications and variations may be made. For example, the above embodiments have been described with regard to the seat belt retractor 1 to be installed in an automobile, the seat belt retractor of the present invention can also be adapted to seat belt apparatuses to be installed in a vehicle for the transfer of occupant(s), such as an automobile, an aircraft, a boat, a train, and a bus.

The priority application Japanese Patent Application No. 2005-305100, filed Oct. 19, 2005 is incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be installed in a vehicle comprising:
    an electric motor;
    a spool operatively associated with the electric motor for winding and unwinding a seat belt for occupant restraint; and
    a controller configured to control a drive of the electric motor based on a seat belt storage starting condition defined by information about a state of the seat belt relative to a vehicle occupant and information about a state of a vehicle door corresponding to the seat belt,
    wherein the controller is configured to control the drive of the electric motor to rotate the spool to wind up the seat belt when the seat belt storage starting condition is satisfied and to temporarily stop the rotation of the spool for a time period when a seat belt load acting on the seat belt exceeds a predetermined amount during the winding up of the seat belt, and
    wherein the time period is set according to a satisfaction pattern of the seat belt storage starting condition.

2. A seat belt retractor as claimed in claim 1, wherein the controller is configured to control the drive of the electric motor to rotate the spool to wind up the seat belt and to set the time period to a first stoppage time period in a case of a first satisfaction pattern of the seat belt storage starting condition where the vehicle door corresponding to the seat belt is in an open state when a wearing of the seat belt relative to the vehicle occupant is cancelled.

3. A seat belt retractor as claimed in claim 2, wherein the controller is configured to control the drive of the electric motor to rotate the spool to wind up the seat belt and to set the time period to a second stoppage time period longer than the first stoppage time period in a case of a second satisfaction pattern of the seat belt storage starting condition where the vehicle door corresponding to the seat belt is in a closed state when the wearing of the seat belt relative to the vehicle occupant is cancelled.

4. A seat belt retractor as claimed in claim 1, wherein the controller is configured to set the time period to be longer than a reference stoppage time period in a case of a satisfaction pattern of the seat belt storage starting condition where a wearing of the seat belt relative to the vehicle occupant is cancelled when the vehicle door corresponding to the seat belt is closed.

5. A seat belt retractor as claimed in claim 1, wherein the controller is configured to set the time period to be shorter than a reference stoppage time period in a case of a satisfaction pattern of the seat belt storage starting condition where a wearing of the seat belt relative to the vehicle occupant is cancelled when the vehicle door corresponding to the seat belt is open.

6. A seat belt apparatus to be installed in a vehicle comprising:
    a seat belt for occupant restraint of a vehicle occupant;
    an electric motor;
    a spool for winding and unwinding the seat belt in association with a drive of the electric motor;
    a controller for controlling the drive of the electric motor;
    a seat belt buckle adapted to be fixed to the vehicle; and
    a tongue attached to the seat belt and for latching to the seat belt buckle when the seat belt is worn,
    wherein the controller is configured to control the drive of the electric motor based on a seat belt storage starting condition defined by information about a state of the seat belt relative to the vehicle occupant and information about a state of a vehicle door corresponding to the seat belt, and
    wherein the controller is configured to control the drive of the electric motor to rotate the spool to wind up the seat belt when the seat belt storage starting condition is satisfied and to temporarily stop the rotation of the spool for a time period when a seat belt load acting on the seat belt exceeds a predetermined amount during the winding up of the seat belt, and
    wherein the time period is set according to a satisfaction pattern of the seat belt storage starting condition.

7. A seat belt apparatus as claimed in claim 6, further comprising
    a buckle detection sensor for detecting that the tongue is latched to the seat belt buckle, and
    a current detection sensor for detecting a current value of the electric motor.

8. A seat belt apparatus as claimed in claim 6, wherein the controller is configured to control the drive of the electric motor to rotate the spool to wind up the seat belt and to set the time period to a first stoppage time period in a case of a first satisfaction pattern of the seat belt storage starting condition where the vehicle door corresponding to the seat belt is in an open state when a wearing of the seat belt relative to the vehicle occupant is cancelled.

9. A seat belt apparatus as claimed in claim 8, wherein the controller is configured to control the drive of the electric motor to rotate the spool to wind up the seat belt and to set the time period to a second stoppage time period longer than the first stoppage time period in a case of a second satisfaction pattern of the seat belt storage starting condition where the vehicle door corresponding to the seat belt is in a closed state when the wearing of the seat belt relative to the vehicle occupant is cancelled.

10. A seat belt apparatus as claimed in claim 6, wherein the controller is configured to set the time period to be longer than a reference stoppage time in a case of a satisfaction pattern of the seat belt storage starting condition where a wearing of the seat belt relative to the vehicle occupant is cancelled when the vehicle door corresponding to the seat belt is closed.

11. A seat belt apparatus as claimed in claim 6, wherein the controller is configured to set the time period to be shorter than a reference stoppage time in a case of a satisfaction pattern of the seat belt storage starting condition where a wearing of the seat belt relative to the vehicle occupant is cancelled when the vehicle door corresponding to the seat belt is open.

12. A vehicle comprising:
    a seat belt apparatus comprising:
        a seat belt for occupant restraint of a vehicle occupant;
        an electric motor;
        a spool for winding and unwinding the seat belt in association with a drive of the electric motor;

a controller for controlling the drive of the electric motor;

a seat belt buckle fixed to the vehicle; and a tongue attached to the seat belt and for latching to the seat belt buckle when the seat belt is worn, wherein the controller is configured to control the drive of the electric motor based on a seat belt storage starting condition defined by information about a state of the seat belt relative to the vehicle occupant and information about a state of a vehicle door corresponding to the seat belt, wherein the controller is configured to control the drive of the electric motor to rotate the spool to wind up the seat belt when the seat belt storage starting condition is satisfied and to temporarily stop the rotation of the spool for a time period when a seat belt load acting on the seat belt exceeds a predetermined amount during the winding up of the seat belt, and wherein the time period is set according to a satisfaction pattern of the seat belt storage starting condition.

* * * * *